Figure 1:
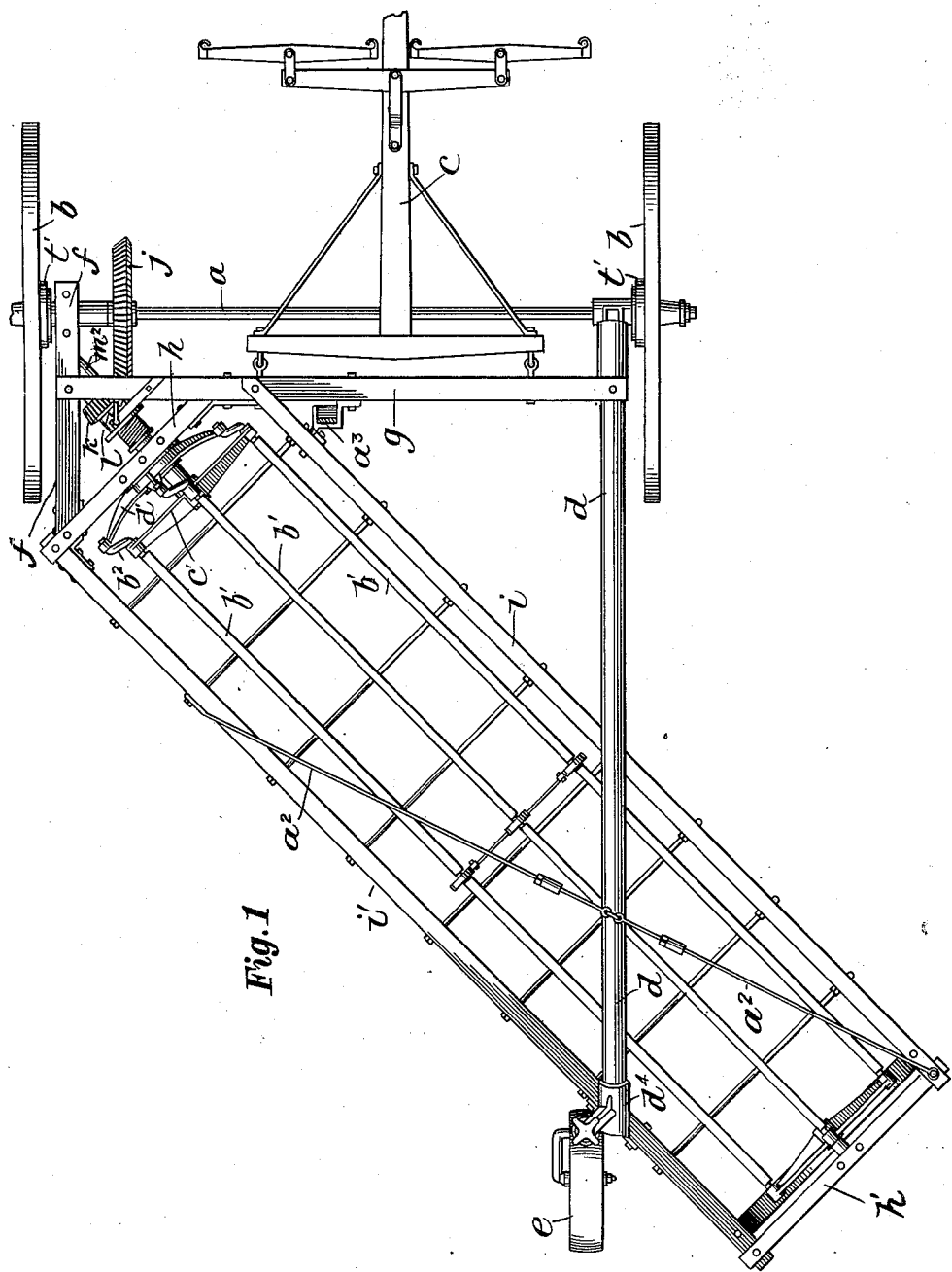

No. 828,119. PATENTED AUG. 7, 1906.
E. A. JOHNSTON.
HAY RAKE.
APPLICATION FILED MAR. 8, 1905.

3 SHEETS—SHEET 1.

WITNESSES:

INVENTOR.
E. A. Johnston
BY
ATTORNEYS

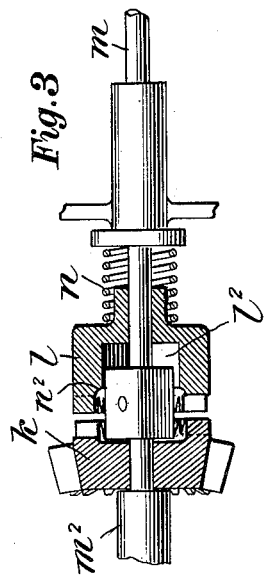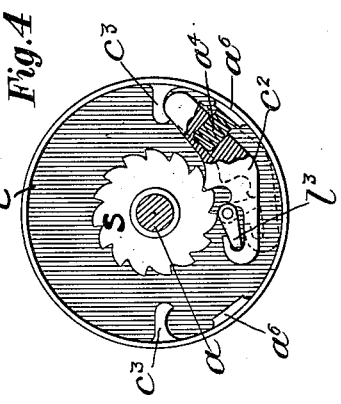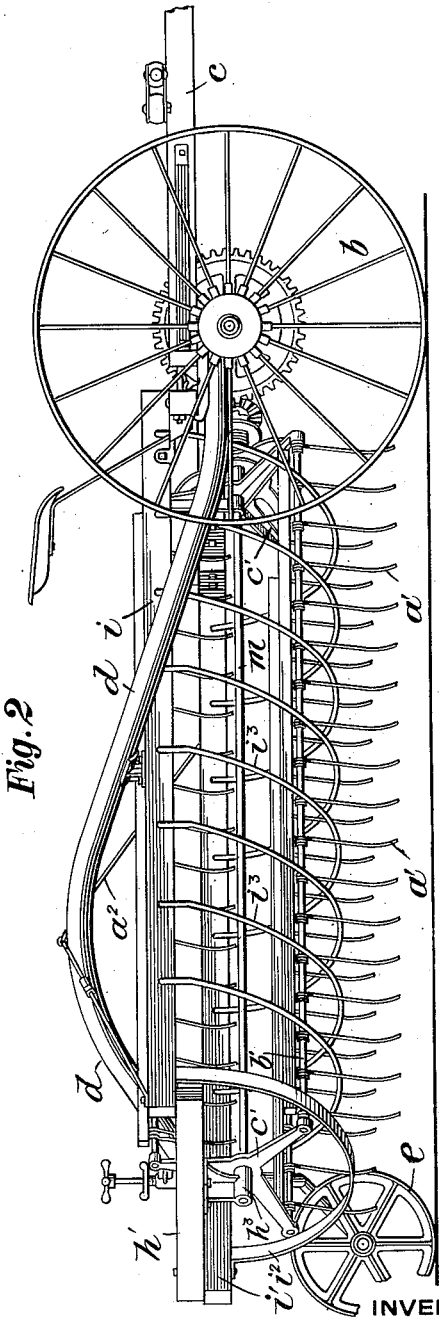

No. 828,119. PATENTED AUG. 7, 1906.
E. A. JOHNSTON.
HAY RAKE.
APPLICATION FILED MAR. 8, 1905.
3 SHEETS—SHEET 3.
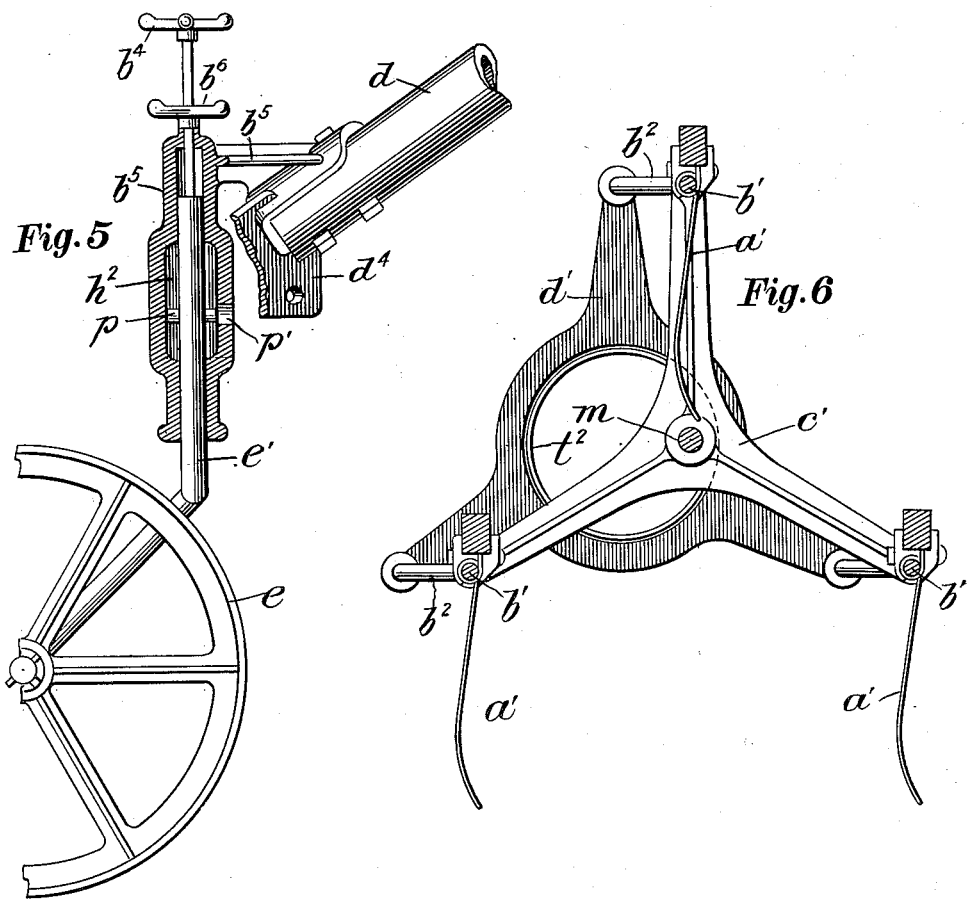
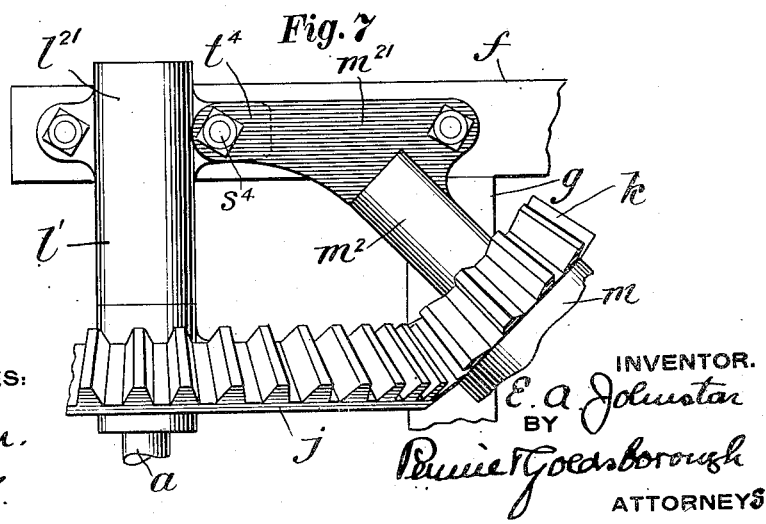

UNITED STATES PATENT OFFICE.

EDWARD A. JOHNSTON, OF STERLING, ILLINOIS.

HAY-RAKE.

No. 828,119.  Specification of Letters Patent.  Patented Aug. 7, 1906.

Application filed March 8, 1905. Serial No. 249,100.

*To all whom it may concern:*

Be it known that I, EDWARD A. JOHNSTON, a citizen of the United States, residing at Sterling, county of Whiteside, Illinois, have invented certain new and useful Improvements in Hay-Rakes; and I do hereby declare the following to be a full, clear, and exact description of the invention, such as will enable others skilled in the art to which it appertains to make and use the same.

The invention relates to side-delivery hay-rakes that travel over the ground in the direction which the mower travels instead of crosswise thereto and rake the hay at an angle to the direction in which the mower leaves it.

The object of the invention is to improve the general construction of the machine and lighten the draft thereof without reducing the strength of the machine or impairing its efficiency of operation.

It is characteristic of the structure that the entire framing, including the side and transverse bars, which support the front end of the reel or tooth frame, is carried in rear of the axle, leaving an unobstructed space between the supporting-wheels forward of the axle, allowing the team to be hitched close to the axle and permitting the frame to be made light and strong and of few parts.

The invention is illustrated in the accompanying drawings, wherein—

Figure 1 is a plan view of the entire machine. Fig. 2 is a side elevation thereof. Fig. 3 is a sectional detail of the clutch connecting the reel or tooth shaft with the main drive-gear. Fig. 4 is an elevation of the clutch which connects the main wheels to the axle. Fig. 5 is a detail, partly in section, of the casting which supports the caster-wheel. Fig. 6 is a transverse section through the reel or tooth frame, and Fig. 7 is a detail of the bearing-boxes for the axle and reel shaft looking up from underneath the axle.

Referring to the views, $a$ denotes the axle, $b$ the main wheels, and $c$ the tongue. The side bars $fd$ are secured at their forward ends directly to the axle and extend rearwardly therefrom only. They are connected together by a cross-bar $g$ in rear of and parallel with the axle and to which the tongue is connected, the cross-bars lying sufficiently above the axle to permit the necessary vertical movement of the tongue.

The reel or tooth frame consists of side bars $i\ i'$ and end bars $h\ h'$, with the usual straps and rods $i^2\ i^3$ for preventing the hay from winding around the tooth-carrying bars $b'$. This frame is arranged diagonally to the line of draft, as shown in Fig. 1, and the reel-shaft $m$ is supported in bearings $h^3$ at its rear end and $m^2$ at its front end.

The front end bar $h$ of the reel-frame is secured in a diagonal position to the side bar $f$ and the cross-bar $g$, and the front side bar $i$ of the frame is secured by a bracket $a^3$ to the cross-bar $g$ about midway of its length. The side bar $d$ is preferably formed of an iron pipe that is arched, as shown in Fig. 2, to pass over the reel-frame and is supported at its rear end by a caster-wheel $e$. The bar $i'$ of the reel-frame is secured to the rear end of the side bar $d$ by a casting and an arched tie-rod $a^2$ is secured at opposite ends to the opposite bars $i\ i'$ of the reel-frame at points near their ends and passes over and rests upon the arch of the side bar $d$, thereby suspending the reel-frame from this bar in a convenient and efficient manner.

The reel-shaft $m$ is driven by the gear $j$ on the axle through the intermediacy of the pinion $k$, that is normally loose on the shaft and is under control by the driver for connection with and disconnection from the shaft, as may be desired, to throw the reel or rake teeth into and out of operation. The pinion $k$ has a clutch-face, which coöperates with a similar face on the clutch half $l$, which slides on the reel-shaft and is held normally in engagement with the pinion by a spring $n$. On the shaft $m$ between the pinion and the clutch half is firmly pinned or otherwise fastened a collar $n^2$, that is square or angular in cross-section. This collar serves to hold the pinion $k$ snugly against its bearing-box $m^2$, and the clutch half $l$ has a bore or recess corresponding in shape with the collar, causing the collar and clutch half to turn together and permitting the clutch half to be disengaged from the pinion without separating it from the collar.

The reel consists of three-armed spiders $c'\ c'$, that are fixed to opposite ends of the shaft $m$ and have journaled in their outer ends the shaft or bars $b'$, to which the usual teeth $a'$ are connected. At their forward ends the tooth-bars are provided with cranks $b^2$, which pivotally connect the bars to the outer ends of another spider $d'$, similar to $c'$, but mounted eccentrically to the reel-shaft $m$ and journaled upon an annular bearing-ring $t^2$, that is secured to the end bar $h$ at the front of the reel-frame, the object of this arrangement being to compel the rake-teeth $a'$ to maintain a vertical position in a manner that is well understood in this class of machines.

The supporting-wheels of the machine are connected to the axle by clutches or backing-ratchets, so as to permit them to turn independently of each other. The construction of these clutches is shown in Fig. 4, where $a$ denotes the axle, and $s$ a toothed ratchet-disk fixed thereon. $t'$ denotes the cup-shaped hub of the wheel, and $c^2$ indicates a pawl which is inclosed within this hub and is held therein by a recessed lug $c^3$, against which the heel of the pawl abuts, and a spring $a^4$, which fits in sockets in the pawl and rim of the hub, so as to hold the pawl normally in engagement with the teeth of the ratchet-disk. As will be noted in Fig. 4, the hub $t$ is provided with an additional recessed lug $c^3$ at a point diametrically opposite from the one already described. An additional spring-receiving socket $a^6$ is provided on the opposite side of the shaft from the socket first mentioned. The object of this arrangement is to make the clutches reversible, so that any particular clutch may be applied to either wheel by simply reversing the position of the pawl $c^2$ and changing it from one of the lugs $c^3$ to the other. The pawl $c^2$ may be thrown out of connection with the ratchet and locked in that position by means of a latch $l^3$, which is located between the nose of the pawl and the ratchet-disk, as shown in Fig. 4, and is mounted on a pivot which extends through the hub of the wheel, so that it may be operated from the outer side and set in the position shown in dotted lines in Fig. 4, when the wheel will turn freely in either direction on the axle and the clutch be out of action.

The rear end of the machine is supported by the caster-wheel $e$, that is secured to the rear end of the side bar $d$, as already described. This caster-wheel has a vertical spindle $e'$, that turns in a bearing in the bracket-casting $b^5$ and is provided with an adjusting-wheel $b^4$ and a locking-wheel $b^6$. It sometimes happens that it is necessary to lift the rear end of the machine, and two caster-wheels are sometimes employed, and it is advisable to prevent the spindle from falling out of the socket when the machine is lifted, or one wheel by passing over any obstruction lifts the other from the ground. In order to provide for the holding of the spindle of the wheel in its bearing in the casting $b^5$ and at the same time to permit of the necessary vertical adjustment of the spindle, I provide the bearing with an enlargement $h^2$ and put a pin $p$ transversely through the spindle, driving the pin into the spindle through a hole $p'$ in the bearing after the spindle has been inserted. As will be seen from Fig. 5, this prevents the spindle $e'$ from dropping out of the bearing and at the same time allows for the necessary vertical adjustment of the spindle in the bearing.

The frame-pieces $f$ and $g$ are wooden bars, and, as shown in Fig. 7, the bearing-boxes $l'$ and $m^2$ for the axle and reel-shaft, respectively, are secured thereto by flanges $l^{21}$ and $m^{21}$. When these flanges are separately secured to the bars, it is difficult to fasten them so that the gears will be held in proper mesh. I therefore make the flanges on adjacent sides of the boxes of sufficient length to overlap, as shown at $t^4$ in Fig. 7, and I secure both flanges to the bar $f$ by one bolt $s^4$, thereby locking the two boxes rigidly together and holding them in fixed relation without relying upon independent fastenings for securing them separately to the side bars. Considering the strain that is thrown on these boxes by the gears in the operation of the machine, this is an important feature.

Having thus described the invention, what I claim, and desire to secure, is—

1. In a side-delivery hay-rake, the combination of the axle, side bars $d$, $f$ extending rearward therefrom, the transverse frame-bar $g$ connecting the side bars in rear of the axle, the diagonal bar $h$ connected to the side bar $f$ and cross-bar $g$, the reel frame-bars $i$, $i'$, the latter supported by the side bar $d$, and the diagonal arched tie-rod $a^2$ connected to the frame-bars near their opposite ends and passing over the side bar $d$.

2. In a side-delivery hay-rake, the combination of the axle, the side bars $d$, $f$, extending rearward therefrom, the diagonal tooth-frame, the rake-shaft $m$, a gear $j$ on the axle, a pinion $k$ on the shaft, and bearing-boxes $l'$, $m^2$, for the axle and shaft, respectively, said boxes having their adjacent securing-flanges overlapped and secured to the side bar $f$ by a bolt passing through both flanges.

3. In a side-delivery hay-rake, the combination of an axle, a raking mechanism angularly disposed relative to and in rear of said axle, a supporting-frame for said raking mechanism pivotally mounted upon said axle and a draft-tongue flexibly connected with said supporting-frame above and in rear of said axle.

4. In a side-delivery hay-rake, the combination of an axle, a raking mechanism angularly disposed relative to and in rear of said axle, a supporting-frame for said raking mechanism, said axle being journaled in said supporting-frame at its forward end, and a draft-tongue pivotally connected with said supporting-frame, said pivotal connection being above and in rear of the axle.

5. In a side-delivery hay-rake, the combination of an axle, a raking mechanism angularly disposed relative to and in rear of said axle, a supporting-frame for said raking mechanism comprising rearwardly-extending side bars, said axle being journaled at the forward ends of said bars, a transverse frame-bar connected to the said bars and disposed above and in rear of said axle, and a draft-tongue flexibly connected with said transverse bar.

6. In a side-delivery hay-rake, the combination of an axle, a raking mechanism angularly disposed relative to and in rear of said axle, a supporting-frame for said raking mechanism comprising an arched member extending rearwardly over the raking mechanism and having its front end pivotally mounted upon said axle, a draft-tongue flexibly connected with said supporting-frame in rear of the axle, and the raking mechanism connected to the rear portion of the overhead arched member.

7. In a side-delivery hay-rake, the combination of an axle, a raking mechanism angularly arranged in rear of said axle, means for supporting said raking mechanism comprising side bars having their front ends pivotally mounted upon the axle at opposite ends thereof, the side bar upon the delivery side of the machine being arched, a transverse frame connected to the side bars near their front ends and in rear of said axle, a diagonally-arranged frame in which said rake mechanism is mounted, said frame having its forward end secured to one of said bars and said transverse frame-bar, and its opposite end suspended from said arched side bar, and a truss-rod secured at opposite ends to opposite sides of the diagonal frame and connected with said arched bar.

In testimony whereof I affix my signature in presence of two witnesses.

EDWARD A. JOHNSTON.

Witnesses:
    JAS. L. STEWART,
    E. R. THOMPSON.